United States Patent
Sasaki

(10) Patent No.: US 7,669,581 B2
(45) Date of Patent: Mar. 2, 2010

(54) THROTTLE CONTROL APPARATUS AND METHOD FOR THROTTLE CONTROL

(75) Inventor: Kazushi Sasaki, Owariasahi (JP)

(73) Assignee: Denso Corporation, Kariya (JP)

( * ) Notice: Subject to any disclaimer, the term of this patent is extended or adjusted under 35 U.S.C. 154(b) by 135 days.

(21) Appl. No.: 11/783,003

(22) Filed: Apr. 5, 2007

(65) Prior Publication Data

US 2007/0240676 A1    Oct. 18, 2007

(30) Foreign Application Priority Data

Apr. 12, 2006  (JP) .............................. 2006-109715

(51) Int. Cl.
*F02D 11/10* (2006.01)
*F16K 31/04* (2006.01)

(52) U.S. Cl. .................. 123/399; 251/129.12

(58) Field of Classification Search .............. 123/337, 123/361, 396, 399, 568.23, 568.24; 251/129.11, 251/129.12, 304, 305
See application file for complete search history.

(56) References Cited

U.S. PATENT DOCUMENTS

| | | | | |
|---|---|---|---|---|
| 3,180,266 | A * | 4/1965 | Smith .......................... | 417/282 |
| 4,860,706 | A * | 8/1989 | Suzuki et al. ............... | 123/337 |
| 6,032,924 | A * | 3/2000 | Castle .................... | 251/129.12 |
| 6,390,062 | B1 * | 5/2002 | Saito et al. .................. | 123/399 |
| 6,923,157 | B2 * | 8/2005 | Torii et al. .................... | 123/337 |
| 6,932,051 | B2 * | 8/2005 | Soshino et al. ............... | 123/337 |
| 6,945,228 | B2 * | 9/2005 | Saito et al. .................... | 123/399 |
| 7,040,283 | B2 * | 5/2006 | Soshino et al. ............... | 123/337 |
| 7,121,259 | B2 * | 10/2006 | Wayama et al. .............. | 123/399 |
| 7,168,682 | B2 | 1/2007 | Nanba et al. | |
| 7,234,444 | B2 | 6/2007 | Nanba et al. | |

FOREIGN PATENT DOCUMENTS

EP    1 426 589          6/2004
JP    2003307280 A  * 10/2003 ................. 123/399

OTHER PUBLICATIONS

Kazushi Sasaki, U.S. Appl. No. 11/783,008, filed Apr. 5, 2007.
Chinese Office Action dated May 8, 2009 issued in counterpart Chinese Application No. 200710096521.1, with English translation.

* cited by examiner

*Primary Examiner*—Willis R Wolfe, Jr.
(74) *Attorney, Agent, or Firm*—Nixon & Vanderhye, P.C.

(57) ABSTRACT

A throttle control apparatus includes a valve. A motor is provided for generating driving force to rotate the valve. Gears transmit the driving force to the valve. A biasing unit generates biasing force to bias the valve in a close rotative direction. A control unit is provided for supplying electricity to the motor to generate the driving force. When the control unit terminates electricity supply to the motor, the valve is biased to a full close position by the biasing force. When the control unit performs a full close control to manipulate the valve toward the full close position, the control unit continues electricity supply to the motor to stop the valve at a full close control point, which is set in advance of the full close position.

17 Claims, 4 Drawing Sheets

THROTTLE CONTROL APPARATUS AND METHOD FOR THROTTLE CONTROL

CROSS REFERENCE TO RELATED APPLICATIONS

This application is based on and incorporates herein by reference Japanese Patent Application No. 2006-109715 filed on Apr. 12, 2006.

FIELD OF THE INVENTION

The present invention relates to a throttle control apparatus. The present invention further relates to a method for a throttle control.

BACKGROUND OF THE INVENTION

Conventionally, a throttle control apparatus includes a motor control unit (throttle position control unit) for controlling electricity supplied to an electric motor so as to manipulate a valve member relative to a housing in a fluid control valve.

According to EP 1426589 A2 (JP-A-2004-169614), an exhaust gas recirculation apparatus (EGR apparatus) is disclosed as an example of a fluid control valve. An internal combustion engine discharges exhaust gas from a combustion chamber thereof, and the EGR apparatus recirculates the exhaust gas as EGR gas partially into an air intake pipe of the engine. An exhaust gas recirculation valve (EGR valve) is provided midway through an exhaust gas recirculation pipe (EGR pipe) of the exhaust gas recirculation apparatus (EGR apparatus). The electric motor produces driving force to manipulate the butterfly valve so as to rotate the butterfly valve in a control range between a full close position and a full open position. Thus, the butterfly valve serves as an electric EGR valve to control an amount of EGR gas recirculated into the intake pipe, which communicates with the combustion chamber of the engine.

The throttle control apparatus includes an electric motor serving as a power source for controlling the butterfly valve. The throttle control apparatus further includes reduction gears serving as a transmission device to control rotation speed of a motor shaft of the electric motor at a predetermined gear ratio by performing two-stage gear reduction. The reduction gears increase driving force of the electric motor transmitted to the valve shaft of the butterfly valve. The reduction gears are constructed of first to third gears. The first gear is fixed to the motor shaft of the electric motor for rotating around the axis of the motor shaft. The second gear serves as an intermediate reduction gear rotative around the axis of a gear shaft press-inserted into the housing. The third gear serves as a valve gear fixed to a valve shaft of the butterfly valve rotative around the axis of the valve shaft. The intermediate gear is integrated with a large diameter gear, which is geared with the motor gear, and a small diameter, which is geared with the valve gear.

In the EGR valve disclosed in EP 1426589 A2, a return spring is provided between the valve gear and the housing to bias the butterfly valve in the close rotative direction relative to the valve gear. In this structure, when electricity supply to the electric motor is terminated, the return spring applies biasing force to the valve gear, thereby rotating the valve gear in the close rotative direction. Thus, the butterfly valve, which is connected with the valve gear via the valve shaft, is returned to the full close position.

In the EGR valve disclosed in EP 1426589 A2, the outer circumferential periphery of the butterfly valve defines an annular seal ring groove provided with a C-shaped seal ring for reducing leakage of EGR gas when the butterfly valve rotates in the close rotative direction. In this structure, tension works to radially expand the seal ring, so that a gap between the outer circumferential periphery of the butterfly valve and the wall surface defining the fluid passage in the housing is sealed as the butterfly valve rotates in the close rotative direction toward the full close position.

In this structure, electricity supply to the electric motor is terminated when a full close control is performed to manipulate the butterfly valve to be in the full close position. In this operation, the butterfly valve is returned to the full close portion by being applied with the biasing force of the return spring. In general, gears define a predetermined backlash therebetween so that gears are smoothly movable in the structure of the reduction gears. In a condition where the butterfly valve is maintained in the full close position by being applied with the biasing force of the return spring, the motor gear and the intermediate gear may rattle due to a gap (backlash) between surfaces via which the motor gear is in contact with the intermediate gear. In addition, in this condition, the intermediate gear and the valve gear may rattle due to the gap (backlash) between surfaces via which the intermediate gear is in contact with the valve gear.

In particular, the vehicle and the engine may drastically vibrate when the vehicle is operated at high speed or when high road is imposed on the engine. In this condition, vibration of the vehicle and/or the engine may be transmitted to the housing, and consequently, the first to third gear, i.e., the motor gear, the intermediate gear, and the valve gear may drastically vibrate. When the motor gear and the intermediate gear vibrate, the surfaces of the motor gear and the intermediate gear repeat collision and ablation therebetween. As a result, the surfaces of the motor gear and the intermediate gear may abnormally abrade away. When the intermediate gear and the valve gear vibrate, the surfaces of the intermediate gear and the valve gear repeat collision and ablation therebetween. As a result, the surfaces of the intermediate gear and the valve gear may abnormally abrade away.

As a result, when the butterfly valve is rotated to the open rotative direction by utilizing the driving force of the electric motor, the motor gear and the intermediate gear may insufficiently mesh with each other. Consequently, the motor gear may spin with respect to the intermediate gear, or the motor gear may be stack to the intermediate gear. In addition, the intermediate gear and the valve gear may insufficiently mesh with each other, consequently, the intermediate gear may spin with respect to the valve gear, or the intermediate gear may be stack to the valve gear. Accordingly, in the EGR valve disclosed in EP 1426589 A2, the reduction gears may not sufficiently transmit power, consequently, the butterfly valve may not be properly operated.

SUMMARY OF THE INVENTION

The present invention addresses the above disadvantage. According to one aspect of the present invention, a throttle control apparatus has a fluid passage connecting with a combustion chamber of an internal combustion engine. The throttle control apparatus includes a valve for communicating and blocking the fluid passage. The throttle control apparatus further includes a motor for generating driving force to rotate the valve in at least one of an open rotative direction and a close rotative direction. The throttle control apparatus further includes a plurality of gears for transmitting the driving force of the motor to the valve. The throttle control apparatus further includes a biasing unit for generating biasing force to bias the valve in the close rotative direction. The throttle control apparatus further includes a control unit for supplying electricity to the motor to generate the driving force. When the control unit terminates electricity supply to the motor, the valve is biased to a full close position by being applied with the biasing force of the biasing unit. When the control unit performs a full close control to manipulate the valve toward the full close position, the control unit continues electricity supply to the motor to stop the valve at a full close control point, which is set in advance of the full close position.

According to another aspect of the present invention, a throttle control apparatus has a fluid passage connecting with a combustion chamber of an internal combustion engine. The throttle control apparatus includes a valve for communicating and blocking the fluid passage. The throttle control apparatus further includes a motor for generating driving force to rotate the valve in at least one of an open rotative direction and a close rotative direction. The throttle control apparatus further includes a plurality of gears for transmitting the driving force of the motor to the valve. The throttle control apparatus further includes a biasing unit for generating biasing force to bias the valve in at least one of the open rotative direction and the close rotative direction. The throttle control apparatus further includes a control unit for supplying electricity to the motor to generate the driving force. When the control unit terminates electricity supply to the motor, the valve is biased to a full close position by being applied with the biasing force of the biasing unit. When the valve is in a predetermined range in the vicinity of the full close position, the control unit is adapted to controlling electricity supplied to the motor such that the valve repeats movement to pass through the full close position.

According to another aspect of the present invention, a method for throttle control includes supplying electricity to a motor for generating driving force transmitted to a valve via a plurality of gears. The valve is biased toward a full close position by applying biasing force in a close rotative direction. The method further includes setting a full close control point in advance of the full close position with respect to the close rotative direction. The method further includes continuing the supplying of electricity to the motor to stop the valve at the full close control point when the valve is manipulated toward the full close position.

According to another aspect of the present invention, a method for throttle control includes supplying electricity to a motor for generating driving force to rotate a valve, which is biased in at least one of the open rotative direction and the close rotative direction toward a full close position. The method further includes controlling the electricity supplied to the motor such that the valve repeats movement to pass through the full close position when the valve is in a predetermined range in the vicinity of the full close position.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1A:
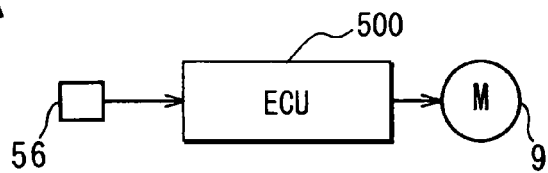
FIG. 1A is a block diagram showing a throttle control apparatus.
Figure 1B:
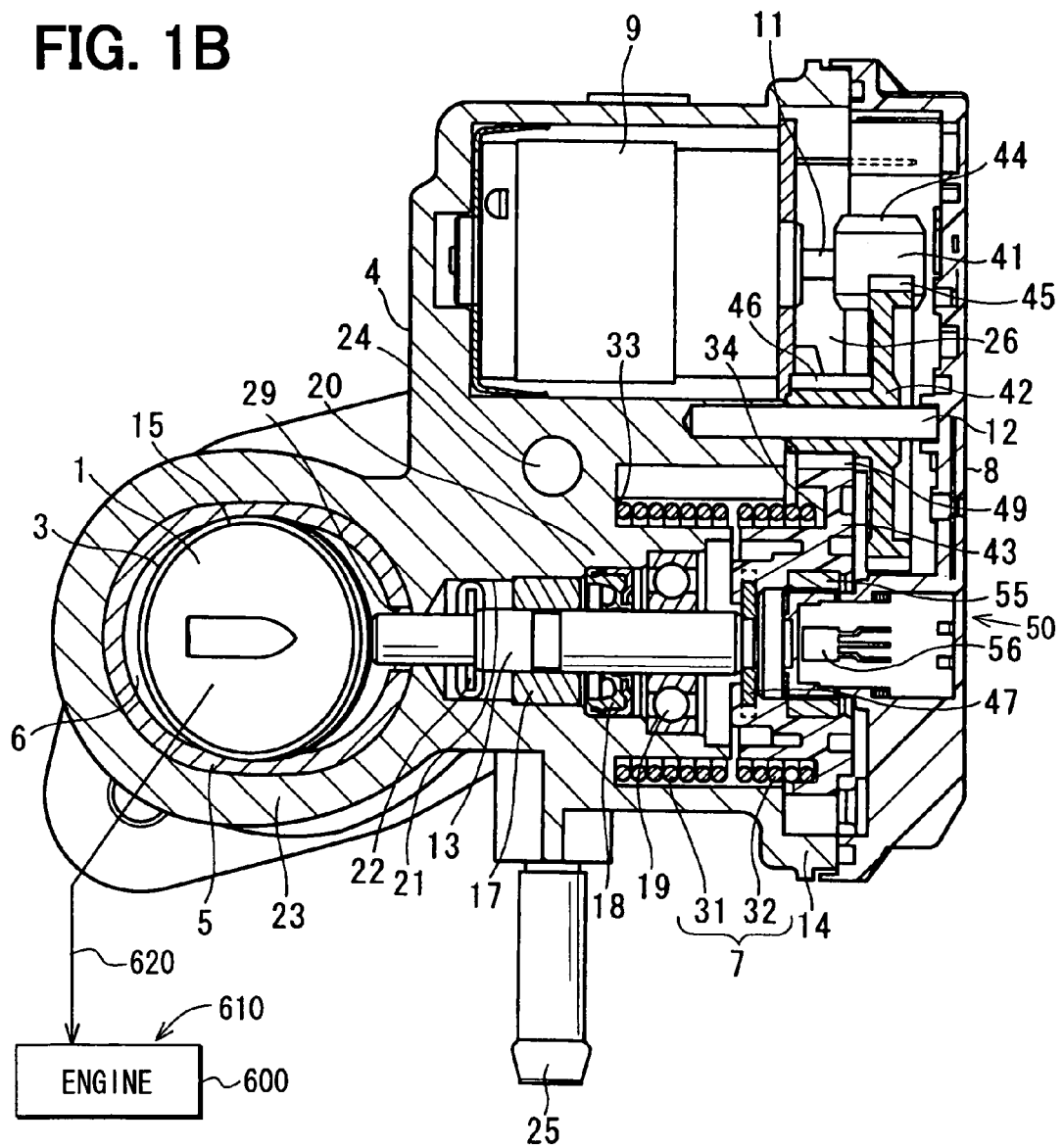
FIG. 1B is a partially sectional view showing an EGR control apparatus of the throttle control apparatus.
Figure 2:
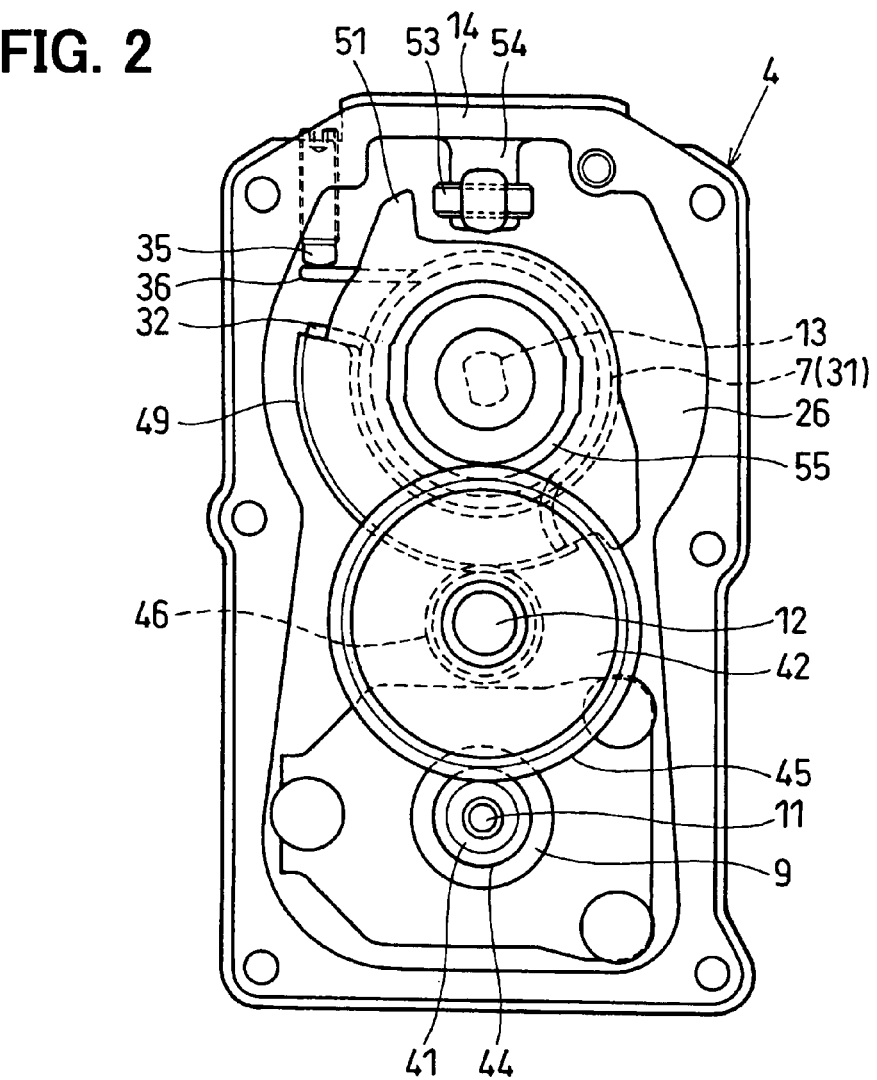
FIG. 2 is a plan view showing a motor actuator of the EGR control apparatus.

As shown in FIGS. 1A to 4B, in this embodiment, an exhaust gas recirculation apparatus (EGR apparatus) is provided to an internal combustion engine 600 mounted in an engine room of a vehicle such as an automobile. The EGR apparatus includes an exhaust gas recirculation control valve (EGR valve) for controlling an amount of exhaust gas recirculated through an exhaust gas recirculation pipe (EGR pipe). The EGR apparatus further includes a throttle control apparatus for actuating a butterfly valve (valve member) 1 of the EGR valve.

The engine 600 is, for example, a direct-injection diesel engine, in which fuel is injected directly into combustion chambers 610. The engine 600 may be a turbocharged diesel engine. The engine 600 includes an intake pipe, an exhaust pipe, and a purification device. Intake air is supplied into each combustion chamber 610 of each cylinder of the engine 600 through the intake pipe. Exhaust gas is discharged from the combustion chamber 610 to the outside through the exhaust pipe and the purification device.

The engine 600 has cylinders each defining the combustion chamber 610 that discharges exhaust gas. The EGR apparatus recirculates the discharged exhaust gas as EGR gas from the engine 600 partially into the intake pipe of the engine 600. The EGR pipe defines therein an EGR passage 620. The EGR passage 620 communicates an exhaust passage, defined in the exhaust pipe, with an intake passage, defined in the intake pipe. The EGR passage 620 constructs a fluid passage communicating with each combustion chamber 610 of each cylinder of the engine 600.

The EGR-valve of the EGR apparatus serves as a fluid control valve. The EGR valve includes the butterfly valve 1 and a housing 4. The butterfly valve 1 controls an EGR flow rate of exhaust gas in accordance with a throttle position thereof. The butterfly valve 1 has the outer circumferential periphery defining a seal ring groove (annular groove) 2 into which a seal ring 3 is fitted. The housing 4 rotatably accommodates the butterfly valve 1 therein. The housing 4 defines therein an EGR passage (fluid passage) 6. In this embodiment, the EGR valve manipulates a communication area of the EGR passage (fluid passage) 6 to control an amount (EGR amount) of EGR gas to be mixed with intake air. The EGR amount corresponds to a rate (EGR rate) of EGR gas with respect to an amount of intake air.

In general, the butterfly valve 1 is in a full close position (O) when the engine 600 stops. Alternatively, a full close control may be performed for manipulating the butterfly valve 1 to the full close position (O) in a condition where the engine 600 operates. When the butterfly valve 1 is in the full close position (O), or when the full close control is performed, the seal ring 3 air tightly seals a gap between the butterfly valve 1 and the housing 4 by utilizing tension of the seal ring 3, which is fitted to the seal ring groove 2 of the butterfly valve 1. The tension of the seal ring 3 works in the radial direction (radially expanding direction) of the seal ring 3 perpendicularly to the axis of the seal ring 3 in the EGR valve. The housing 4 has a nozzle 5 serving as a cylindrical portion. The nozzle 5 accommodates the butterfly valve 1 such that the butterfly valve 1 is capable of communicating and blocking the EGR passage in the nozzle 5.

The EGR apparatus includes a throttle control apparatus. The throttle control apparatus is constructed of a coil spring (biasing unit) 7, a valve driving device (valve driving unit), an engine control unit (ECU) 500, and the like. The coil spring 7 biases the butterfly valve 1 toward the full close position (O). The valve driving device (valve driving unit) includes an electric motor 9 as a power source for manipulating the butterfly valve 1 in either a close rotative direction (CL) or an open rotative direction (OP). The ECU 500 controls electricity supplied to the valve driving device, in particular, the electric motor 9 so as to control the throttle position of the butterfly valve 1. The ECU 500 serves as a motor control unit.

Figure 3:
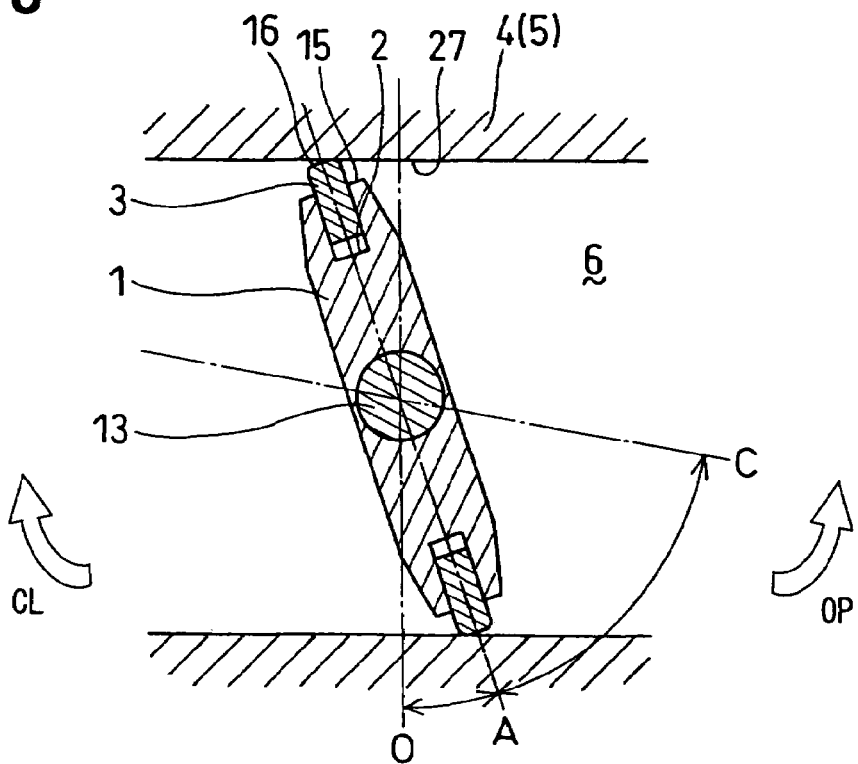
FIG. 3 is a schematic view showing a full close control point in a full close control of a butterfly valve and a control range of the butterfly valve in the throttle control apparatus, according to a first embodiment.

Here, in this example, as referred to FIG. 3, the full close rotative direction (CL) of the butterfly valve 1 is in the clockwise direction in FIG. 3, as depicted by the arrow CL. The full open rotative direction (OP) of the butterfly valve 1 in the anticlockwisewise direction in FIG. 3, as depicted by the arrow OP.

In this embodiment, the EGR valve is arranged midway through the EGR pipe of the EGR apparatus. Alternatively, the EGR valve may be arranged in a branch portion in which the EGR pipe is branched from the exhaust pipe. Alternatively, the EGR valve may be arranged in a merging portion in which the EGR pipe joins the intake pipe.

In this embodiment, the housing 4 has an outer wall surface, which is integrated with a gear housing 14. The gear housing 14 accommodates a motor shaft 11, an intermediate shaft 12, and a valve shaft 13, which are substantially in parallel with each other. The motor shaft 11 serves as an output shaft of the electric motor 9. The intermediate shaft 12 axially extends to serve as an intermediate reduction gear. The valve shaft 13 serves as an input shaft of the butterfly valve 1.

The butterfly valve 1 is formed of a heat-resistant material such as stainless steel to be in a substantially disc-shape. The EGR passage 6 of the housing 4 rotatably accommodates the butterfly valve 1. The butterfly valve 1 is a rotary butterfly-type valve having the valve shaft 13 serving as a rotation axis thereof. The butterfly valve 1 rotates relative to the housing 4 to communicate and block the EGR passage 6. The butterfly valve 1 is fixed to the axially tip end of the valve shaft 13 in a condition where the butterfly valve 1 is inclined with respect to the axis of the valve shaft 13 by a predetermined angle, so that the butterfly valve 1 constructs an inclined plate in this structure. The valve shaft 13 is applied with driving force (driving force) of the electric motor 9, so that the valve shaft 13 is rotated.

The ECU 500 transmits a control signal to manipulate the throttle position of the butterfly valve 1 within a throttle control range between a full open position (C) and a full close control point so as to control the opening area of the EGR passage 6, which defines a communication area of EGR gas during the engine operation. Thus, the ECU 500 controls the EGR amount by which EGR gas is mixed with intake air flowing through the intake passage. The full close control point is set in advance of the full close position (O). The butterfly valve 1 has a radially outer portion having the outer diameter less than the inner diameter of the nozzle 5, which is fitted to the housing 4. This radially outer portion of the butterfly valve 1 has the outer circumferential periphery, which is provided with the seal ring groove 2 being substantially annular. The seal ring groove 2 circumferentially extends in the outer circumferential periphery of the butterfly valve 1. The seal ring groove 2 is defined entirely throughout the outer circumferential periphery 15 of the butterfly valve 1. The seal ring 3 is fitted into the seal ring groove 2.

The seal ring 3 is in a substantially C-shape. The seal ring 3 has circumferentially end surfaces defining a notch therebetween for absorbing expansion and shrinkage of the seal ring 3 caused due to difference between thermal expansion coefficients of the housing 4 and the seal ring 3. The outer circumferential surface of the seal ring 3 slides on the inner circumferential periphery of the nozzle 5 in the vicinity of the full close position (O) within a predetermined rotation angular range in a condition where the butterfly valve 1 is closed or during the full-close control. The inner circumferential periphery of the nozzle 5 defines the fluid passage in the housing 4. The outer circumferential surface of the seal ring 3 serves as a seal ring slide surface 16. The slide surface 16 of the seal ring 3 has a pair of edge portions (FIG. 3) with respect to the axial direction thereof. The edge portions of the slide surface 16 of the seal ring 3 may be chamfered to be in tapered shapes or in R-shapes, so that the butterfly valve 1 is readily slidable relative to the nozzle 5.

The seal ring 3 has the inner circumferential periphery defining a radially inner end fitted into the seal ring groove 2 of the butterfly valve 1 such that the seal ring 3 is axially and circumferentially movable relative to the butterfly valve 1. The seal ring 3 has the outer circumferential periphery defining a radially outer end protruding radially outwardly beyond the outer circumferential periphery of the butterfly valve 1. Specifically, the seal ring 3 is fitted into the seal ring groove 2 such that the radially inner end of the seal ring 3 is movable radially, axially, and circumferentially with respect to the seal ring groove 2, in a condition where the radially outer end of the seal ring 3 protrudes from the outer circumferential periphery 15 of the butterfly valve 1.

In this embodiment, the housing 4 is formed by die casting of aluminum alloy to be in a predetermined shape. The butterfly valve 1 is rotatable in the EGR passage 6 of the housing 4 substantially from the full close position (O) to the full open position (C). The housing 4 is fixed to either the EGR pipe, the intake pipe, or the exhaust pipe using a fastener such as a bolt. The housing 4 has a bearing portion 20 that slidably supports the valve shaft 13 via a bearing member constructed of, for example, a bushing 17, an oil seal 18, and a ball bearing 19.

The bearing portion 20 has a shaft hole 21 therein. The shaft hole 21 extends along the axis of the valve shaft 13. The shaft hole 21 has a communication hole 22 on the side of the nozzle 5. Foreign matters such as unburned fuel and particles e.g., carbon contained in exhaust gas may intrude into the shaft hole 21. Even in this condition, the foreign matters can be removed from the shaft hole 21 into the EGR passage 620, which is in the EGR pipe downstream of the butterfly valve 1 with respect to the EGR gas flow, through the communication hole 22 by utilizing, for example, negative pressure in the intake pipe. The housing 4 has a nozzle-fitting portion 23, in substantially annular shape, fitted to the nozzle 5. The housing 4 has a cooling water circulation passage 24 around the full close position (O) of the butterfly valve 1, the bearing portion 20, and/or the nozzle-fitting portion 23. The housing 4 is connected with a cooling water pipe 25 through which engine cooling water is supplied into the cooling water circulation passage 24. The housing 4 has a gear accommodating chamber (motor accommodating chamber) 26 between the sensor cover 8 and the gear housing 14 for accommodating the electric motor 9 and the reduction gears.

The nozzle 5 is a part of the EGR pipe. The nozzle 5 serves as a cylindrical member rotatably accommodating the butterfly valve 1. The nozzle 5 is formed of a heat resistive material such as stainless steel to be in a cylindrical shape. The nozzle 5 is fitted to the inner circumferential periphery of the nozzle-fitting portion 23 of the housing 4 by press-fitting, for example. The nozzle 5 defines the EGR passage 6 therein. The inner circumferential periphery of the nozzle 5, in particular, the inner periphery in the vicinity of the full close position (O) of the butterfly valve 1 defines a seal ring seat surface 27. The seat surface 27 of the nozzle 5 is capable of tightly sealing with the slide surface 16 of the seal ring 3 when the butterfly valve 1 is manipulated to the full close position (O). The nozzle 5 has a shaft through hole 29, through which the valve shaft 13 extends.

The coil spring 7 includes a return spring 31 for applying biasing force (spring force) to the butterfly valve 1 toward the full close position (O) via a final gear (third gear) of the reduction gears, which is constructed of first to third gears. The third gear is arranged in the vicinity of the butterfly valve 1. The coil spring 7 further includes a default spring 32 for applying biasing force (spring force) to the butterfly valve 1 via the third gear such that the butterfly valve 1 communicates the EGR passage. The outer wall of the gear housing 14 defines a first recess 33 in a substantially annular shape. The third gear has an annular portion defining a second recess 34 in a substantially annular shape. The coil spring 7 is arranged between the first recess 33 and the second recess 34. The return spring 31 has one end, on the left side in FIG. 1B, wound in a return direction. The default spring 32 has one end, on the right side in FIG. 1B, wound in a default direction, which is different from the return direction. The coil spring 7 is constructed by integrating the other end of the return spring 31 on the right side in FIG. 1B with the other end of the default spring 32 on the left side in FIG. 1B to be one spring member.

The other end of the return spring 31 is connected with the other end of the default spring 32 via a connecting portion to which a U-shaped hook portion 36 is provided. The U-shaped hook portion 36 is supported by a full close stopper 35, which is screwed into the housing 4, when the engine 600 stops or when electricity supply to the electric motor 9 is terminated. The full close stopper 35 serves as a maximum full close limit adjust screw. The U-shaped hook portion 36 is formed by bending the connecting portion between the return spring 31 and the default spring 32 to be in a substantially U-shape. The other end of the return spring 31 is hooked to the first recess 33 of the housing 4 so as to bias the butterfly valve 1 in the close rotative direction (CL) from the full open position (C) toward the full close position (O) of the butterfly valve 1. The return spring 31 serves as a first spring. The other end of the default spring 32 is hooked to the second recess 34 of the third gear so as to bias the butterfly valve 1 in the open rotative direction (OP) from the full close position (O) toward the full open position (C) of the butterfly valve 1. The default spring 32 serves as a second spring.

In this embodiment, the valve actuator device is an electric actuator (motor actuator) constructed of the electric motor 9, a transmission device, and the like for actuating the butterfly valve 1 of the EGR valve so as to communicating and blocking the EGR passage. The electric motor 9 is supplied with electricity to generate driving force so as to rotate the motor shaft 11 thereof. The transmission device transmits the rotation of the motor shaft 11 of the electric motor 9 to the valve shaft 13. In this embodiment, the transmission device is constructed of, for example, reduction gears.

The electric motor 9 is fixed to the gear housing 14, which is integrated to the outer wall of the housing 4. The electric motor 9 may be a DC motor such as a brushless motor or a motor with brush. The electric motor 9 may be an AC motor such as a three-phase-current motor.

The reduction gears construct the transmission device including the first to third gears 41, 42, 43 to control the rotation speed of the motor shaft 11 at a predetermined gear ratio by performing two-stage gear reduction. The reduction gears transmit the driving force of the electric motor 9 to the butterfly valve 1 via the valve shaft 13. The first to third gears 41, 42, 43 are rotatable in the gear housing 14.

The first gear 41, which is one component of the reduction gears, is a motor gear (first rotor member) fixed to the outer circumferential periphery of the motor shaft 11. The first gear 41 is arranged in the vicinity of the electric motor 9 of the reduction gears defining a power transmission path. The first gear 41 is formed of metal or resin to be in a substantially cylindrical shape. The first gear 41 has a cylindrical portion surrounding the outer circumferential periphery of the motor shaft 11. The cylindrical portion of the first gear 41 is fixed by being press-inserted to the outer circumferential periphery of the motor shaft 11. The cylindrical portion of the first gear 41 has the outer circumferential periphery entirely defining teeth 44 geared with the second gear 42.

The second gear 42, which is one component of the reduction gears, is the intermediate gear (second rotor member) being geared with the teeth 44 provided in the outer circumferential periphery of the first gear 41. The second gear 42 is arranged between the first gear 41 and the third gear 43 of the reduction gears defining the power transmission path. The second gear 42 is formed of metal or resin to be in a substantially cylindrical shape. The second gear 42 has a cylindrical portion surrounding the outer circumferential periphery of the intermediate shaft 12, which is in parallel with the motor shaft 11 of the electric motor 9 and the valve shaft 13.

The cylindrical portion of the second gear 42 is engaged with the outer circumferential periphery of the intermediate shaft 12 such that the cylindrical portion is rotatable relative to the intermediate shaft 12. The cylindrical portion of the second gear 42 includes an annular portion constructing the radially outermost portion of the second gear 42 and a small diameter cylindrical portion, which is less than the annular portion in outer diameter. The annular portion of the second gear 42 has the outer circumferential periphery entirely defining teeth (large diameter gear) 45 geared with the teeth 44 of the first gear 41. The annular portion of the second gear 42 has the outer circumferential periphery entirely defining teeth (small diameter gear) 46 geared with teeth of the third gear 43.

The third gear 43, which is one component of the reduction gears, is the valve gear (third rotor member) being geared with the small diameter gear 46 provided to the outer circumferential periphery of the second gear 42. The third gear 43 is arranged in the vicinity of the butterfly valve 1 of the reduction gears defining the power transmission path. The third gear 43 is formed of resin to be in a substantially cylindrical shape. The third gear 43 has a cylindrical portion surrounding the outer circumferential periphery of the valve shaft 13.

The cylindrical portion of the third gear 43 has the inner circumferential periphery, which is insert-molded with a valve gear plate 47. The cylindrical portion of the third gear 43 includes an annular portion constructing a radially outermost portion of the third gear 43. The annular portion of the third gear 43 has the outer circumferential periphery partially defining teeth 49 geared with the small diameter gear 46 in the outer circumferential periphery of the cylindrical portion of the second gear 42. The teeth 49 is formed in the outer circumferential periphery of the annular portion of the third gear 43 to be in a substantially arch-shape or a partially annular shape.

The third gear 43 is provided with an unillustrated opener lever adapted to being hooked to the coil spring 7. The opener lever of the third gear 43 has a hook portion, which is hooked with the end of the default spring 32, and a stopper, which is adapted to being hooked with the U-shaped hook portion 36 of the coil spring 7.

The outer circumferential periphery of the third gear 43 has a full close stopper portion 51. The gear housing 14 is provided integrally with a full close stopper 53, which is in a block-shape. A full close stopper member 54 is screwed to the full close stopper 53. The full close stopper portion 51 of the third gear 43 is mechanically hooked to the full close stopper member 54 when the butterfly valve 1 rotates in the close rotative direction (CL) beyond the full close position (O). The full close stopper member 54 serves as a maximum full close limit adjust screw. The full close stopper 53 and the full close stopper member 54 serve as first regulating members for defining the rotation range of all the butterfly valve 1, the valve shaft 13, and the third gear 43 with respect to the close rotative direction (CL). In this structure, when the full close stopper portion 51 of the third gear 43 makes contact with either the full close stopper 53 or the full close stopper member 54, a movable member such as the butterfly valve 1 is restricted from further rotating in the close rotative direction (CL) beyond either the full close stopper 53 or the full close stopper member 54.

The full close position (O) of the butterfly valve 1 is defined by $\theta=0°$. In this embodiment, either the full close stopper 53 or the full close stopper member 54 defines a maximum full close limit. The maximum full close limit of the butterfly valve 1 is set on the side of the close rotative direction (CL) slightly with respect to the full close position (O, $\theta=0°$), such that the maximum full close limit is defined by $\theta=-17°$, for example. Either one of the full close stopper 53 or the full close stopper member 54 may be provided to the gear housing 14. Both the full close stopper 53 and the full close stopper member 54 may not be provided to the gear housing 14.

The outer circumferential periphery of the third gear 43 has an unillustrated full open stopper portion. The gear housing 14 is provided integrally with an unillustrated full open stopper, which is in a block-shape. An unillustrated full open stopper member is screwed to the full open stopper. The full open stopper portion of the third gear 43 is mechanically hooked to the full open stopper member when the butterfly valve 1 rotates in the open rotative direction (OP) beyond the full open position (C). The full open stopper member serves as a maximum full open limit adjust screw. The full open stopper and the full open stopper member serve as second regulating members for defining the rotation range of all the butterfly valve 1, the valve shaft 13, and the third gear 43 with respect to the open rotative direction (OP). In this structure, when the full open stopper portion of the third gear 43 makes contact with either the full open stopper or the full open stopper member, a movable member such as the butterfly valve 1 is restricted from further rotating in the open rotative direction (OP) beyond either the full open stopper or the full open stopper member.

In this embodiment, either the full open stopper or the full open stopper member defines a maximum full open limit (mechanical full open position) of the butterfly valve 1. The maximum full open limit is set on the side of open rotative direction (OP) with respect to the full close position (O, $\theta=0°$) such that the maximum full open limit is defined by $\theta=+60°$ to 90°, preferably, the maximum full open limit is defined by $\theta=+70°$, for example. Either one of the full open stopper or the full open stopper member may be provided to the gear housing 14. Both the full open stopper and the full open stopper member may not be provided to the gear housing 14.

The motor shaft 11 is rotatable in the gear housing 14. The motor shaft 11 axially extends substantially in straight. The intermediate shaft 12 has one axial end press-inserted into a fitting recess provided to the gear housing 14. The intermediate shaft 12 axially extends substantially in straight. The valve shaft 13 is formed of a heat-resistive material such as stainless steel. The valve shaft 13 is rotatably accommodated in the shaft hole 21 provided to the bearing portion 20 of the housing 4. The valve shaft 13 is a substantially column-shaped metallic member substantially circular in cross section. The valve shaft 13 axially extends straightly from one end to the other end.

The one axial end of the valve shaft 13 protrudes into the EGR passage 6 through the shaft hole 21 of the housing 4 and the shaft through hole 29 of the nozzle 5, so that the one axial end is exposed to the interior of the EGR passage 6. The one axial end of the valve shaft 13 on the side of the butterfly valve 1 is provided with a valve connecting portion (valve fitting portion), which is secured to the butterfly valve 1 by welding, for example. The other axial end of the valve shaft 13 on the opposite side of the butterfly valve 1 is integrally formed with a crimped portion to which the valve gear plate 47, which is insert-formed in the third gear 43, is crimped and fixed.

The valve actuator, in particular the electric motor 9 is controlled in accordance with electricity supplied using the ECU 500. The ECU 500 has a microcomputer including a CPU, a storage unit, an input circuit, an output circuit, and the like. The CPU executes control processings and arithmetic processings. The storage unit is a memory such as a ROM and a RAM that stores control programs and control logics. The ECU 500 subjects a feedback control to electricity supplied to the electric motor 9 when an unillustrated ignition switch is turned ON (IG ON). Specifically, the ECU 500 executes a control program and/or a control logic stored in the memory of the microcomputer so as to control the electricity supplied to the electric motor 9 for manipulating driving force generated from the electric motor 9. Thus, the ECU 500 controls the throttle position (actual position) detected using the EGR sensor 50 to substantially coincide with a control set point (control target), which is predetermined on the basis of an operating condition of the engine 600. The EGR sensor 50 serves as a throttle position sensor.

When the ignition switch is turned OFF (IG OFF), the control, which is performed by the ECU 500 in accordance with the control program and/or the control logic, is forcedly terminated. Various sensors such as a crank angle sensor, an accelerator position sensor, an airflow meter, and a cooling water temperature sensor output detection signals. Each of the detection signals of the various sensors is subjected to A/D conversion using an A/D converter, so that each of the A/D-converted signals is input to the microcomputer. The ECU 500 measures an interval between adjacent pulse signals each output from the crank angle sensor, thereby detecting rotation speed of the engine 600. The ECU 500 serves as a rotation speed detecting unit.

The microcomputer is connected with the EGR sensor 50. The EGR sensor 50 converts the throttle position of the butterfly valve 1 to an electric signal corresponding to the amount of EGR gas flowing into the intake pipe to be mixed with intake air passing through the intake pipe. The EGR sensor 50 outputs the electric signal to the ECU 500. The EGR sensor 50 is a non-contact rotation angle detecting device for detecting the rotation angle of the butterfly valve 1. The EGR sensor 50 is constructed of an unillustrated permanent magnet, a yoke 55, a hall IC 56, and the like. The permanent magnet is constructed of magnet pieces fixed to the inner circumferential periphery of the third gear 43. The yoke 55 is magnetized by the permanent magnet. The hall IC 56 is arranged on the side of the sensor cover. The hall IC 56 outputs a voltage signal corresponding to magnetic flux interlinked with the hall IC. A hall element or a magnetoresistive element may be provided as the noncontact magnetic detection element, instead of the hall IC.

In this embodiment, the EGR apparatus has the substantially C-shaped seal ring 3 fitted to the seal ring groove 2 of the butterfly valve 1. The seal ring 3 is capable of applying sealing force to the seat surface 27 of the nozzle 5 by utilizing radial tension working to radially expand the seal ring 3.

This EGR valve of the EGR apparatus has an EGR leakage dead band ($\alpha°$), in which leakage of EGR gas does not substantially increase, in the vicinity of the full close position (O). In the EGR leakage dead band ($\alpha°$), leakage of EGR gas does not substantially increase because of expansion caused by the tension radially expanding the seal ring 3. The EGR leakage dead band ($\alpha°$) has a range ±2.5 to ±5.5°, or ±3.0 to ±5.0°, or ±3.5° around the full close position (O). Specifically, the seal ring 3 is applied with the tension thereof to radially outwardly expand, so that the seal ring 3 maintains being tightly in contact with the seat surface of the nozzle 5, even when the position of the butterfly valve 1 is slightly out of the full close position (O). The seal ring 3 maintains radially outwardly expanding in a range within a tension limit in which the seal ring 3 is capable of radially outwardly expanding by the tension thereof.

When electricity supplied to the electric motor 9 is terminated, the butterfly valve 1 is in a specific throttle stop position by being applied with the biasing force of the coil spring 7. The ECU 500 detects the specific throttle stop position, when the electricity supply is terminated, and stores the specific throttle stop position as the full close position (O) in the memory of the microcomputer thereof. As shown in FIG. 3, when the butterfly valve 1 is in the full close position (O, $\theta=0°$), the outer circumferential periphery 15 of the butterfly valve 1 and the seat surface 27 of the nozzle 5 define the minimum gap therebetween, so that the EGR amount (EGR gas leakage amount) leaking through the gap becomes minimum. Thus, in this full close position (O), the amount of EGR gas flowing through the EGR passage 6 becomes minimum.

In this embodiment, when electricity supply to the electric motor 9 is terminated, the biasing force of the return spring 31 and the biasing force of the default spring 32 balance at a neutral position, which corresponds to the full close position (O) of the butterfly valve 1 being biased by both the return spring 31 and the default spring 32.

The ECU 500 stores the full open position (C) of the butterfly valve 1 to the memory. When the butterfly valve 1 is in the full open position (C), the outer circumferential periphery 15 of the butterfly valve 1 and the seat surface 27 of the nozzle 5 define the maximum gap therebetween, so that the EGR amount through the gap becomes maximum. Thus, in this full open position (C) where $\theta=60°$ to $90°$, the amount of EGR gas flowing through the EGR passage 6 becomes maximum.

The ECU 500 stores a dead band maximum position (DBMAX), to which the butterfly valve 1 is rotated from the full close position (O) in the open rotative direction (OP) within the EGR leakage dead band ($\alpha°$), as a full close control point (A) in the memory of the microcomputer thereof. As referred to FIG. 3, the full close control point (A) is an intermediate position where $\theta=+2.5°$ to $+5.5°$, preferably $\theta=+3.0°$ to $+5.0°$, or more preferably $\theta=+3.5°$ rotated toward the open rotative direction (OP) with respect to the full close position (O, $\theta=0°$). The full close control point (A) is a neutral position in which the driving force of the electric motor 9 and the biasing force of the return spring 31 balance with each other.

The ECU 500 sets the full close control point (A) within the EGR leakage dead band ($\alpha°$). In this embodiment, the full close control point (A) is set at a dead band maximum position (DBMAX).

The ECU 500 manipulates the butterfly valve 1 from the full close control point (A) in the open rotative direction (OP), i.e., the ECU 500 manipulates the butterfly valve 1 between the full close control point (A) and the full open position (C). In this condition, when the operating condition of the engine 600 changes, the ECU 500 performs the full close control of the butterfly valve 1.

Specifically, the ECU 500 controls electricity supplied to the electric motor 9 in the full close control of the butterfly valve 1 during the engine operation, such that the throttle position of the butterfly valve 1 becomes the full close control point (A), which is set in advance of the full close position (O) in the EGR valve. The full close control point (A) is set on the open side, i.e., in the open rotative direction (OP) with respect to the full close position (O).

That is, the ECU 500 continues electricity supply to the electric motor 9 in the full close control of the butterfly valve 1 during the engine operation, such that the throttle position of the butterfly valve 1 becomes the full close control point (A). The ECU 500 maintains electricity supply to the electric motor 9 at the time point where the throttle position, which is detected using the EGR sensor 50, becomes the full close control point (A). For example, the ECU 500 supplies a small amount of electricity to the electric motor 9 to rotate the butterfly valve in the open rotative direction (OP). In this operation, both the driving force of the electric motor 9 and the biasing force of the return spring 31 are applied to the butterfly valve 1, so that the butterfly valve 1 is held at the full close control point (A).

The ECU 500 performs the control of electricity supplied to the electric motor 9 to rotate the butterfly valve 1 in a control range (A-C) between the full close control point (A) and the full open position (C), thereby controlling the butterfly valve 1 during the engine operation. The ECU 500 stops electricity supply to the electric motor 9 when the engine 600 stops (engine OFF). The ECU 500 stores the rotative angular range between the full close control point (A) and the full open position (C) as the control range (A-C).

Next, operations of the EGR apparatus are described with reference to FIG. 1A to FIG. 4B.

When the ignition switch is turned ON (IG ON), the ECU 500 controls electricity supplied to the electric motor 9, excluding a cold start of the engine 600, for example. In this condition, the ECU 500 controls the electric motor 9 such that an actual throttle position detected using the EGR sensor 50 coincides with a target throttle position, which is set in accordance with the operating condition of the engine 600. The actual throttle position corresponds to an actual EGR amount.

The electric motor 9 is supplied with electricity, so that the motor shaft 11 of the electric motor 9 rotates. The motor shaft 11 rotates, so that the first gear 41 rotates around the motor shaft 11. Torque produced by the electric motor 9 is transmitted from the first gear 41 to the large diameter gear 45 of the second gear 42. As the second gear 42 rotates, the small diameter gear 46 rotates around the axis of the intermediate shaft 12, so that the third gear 43, which is geared with the small diameter gear 46, rotates around the axis of the valve shaft 13. As the third gear 43 rotates, the valve shaft 13 rotates for a predetermined angle, so that the butterfly valve 1 is rotated from the full close position (O) or the full close control point (A) in the open rotative direction (OP) in the EGR valve.

The U-shaped hook portion 36 of the coil spring 7 lifts from the full close stopper 35 in the open rotative direction (OP). In this condition, the biasing force of the return spring 31 works on the third gear 43, and the biasing force of the default spring 32 does not work on the third gear 43 with respect to the rotation of the butterfly valve 1 in the open rotative direction (OP). The electric motor 9 produces torque to rotate the butterfly valve 1 toward the throttle position corresponding to the target throttle position against the biasing force of the return spring 31.

The combustion chamber 610 of the cylinder of the engine 600 discharges exhaust gas such as high-temperature EGR gas. The exhaust gas is partially recirculated from the exhaust passage defined in the exhaust pipe into the intake passage defined in the intake pipe after passing through the EGR pipe including the EGR passage 6 of the housing 4.

When the butterfly valve 1 opens, the ECU 500 controls electricity supplied to the electric motor 9 such that the throttle position of the butterfly valve 1 becomes the full close control point (A) in, for example, at least one of the following conditions:

the operating condition of the vehicle is changed;

the operating condition of the engine 600 is transiently changed; and the diver steps the brake pedal.

The operating condition of the engine 600 is transiently changed in, for example, at least one of the following conditions:

the driver steps the accelerator pedal to be in a full throttle position;

a turbocharger supercharges intake air to the engine 600 when high load is imposed to the engine 600; and the accelerator pedal is stepped to accelerate the vehicle from a steady operating condition.

Thus, as referred to FIG. 3, the throttle position of the butterfly valve 1 is returned to the full close control point (A) by utilizing the driving force of the electric motor 9 and the biasing force of the coil spring 7.

That is, the ECU 500 applies both the driving force of the electric motor 9 and the biasing force of the return spring 31 to the butterfly valve 1, the valve shaft 13, and the reduction gears constructed of the first to third gears 41, 42, 43 by continuing electricity supply to the electric motor 9 in the full close control of the butterfly valve 1 during the engine operation. In this operation, the ECU 500 does not terminate electricity supply to the electric motor 9 in the full close control of the butterfly valve 1 during the engine operation.

As described above, the full close control point (A) is set at an intermediate position, which is slightly in advance of the full close position (O). That is, the full close control point (A) is set at the intermediate position, which is slightly deviated in the open rotative direction (OP) with respect to the full close position (O). In this condition, the U-shaped hook portion 36 of the coil spring 7 lifts slightly from the full close stopper 35 in the open rotative direction (OP). Both the driving force of the electric motor 9 and the biasing force of the return spring 31 work on the third gear 43, and the biasing force of the default spring 32 does not work on the third gear 43.

Figure 4A:
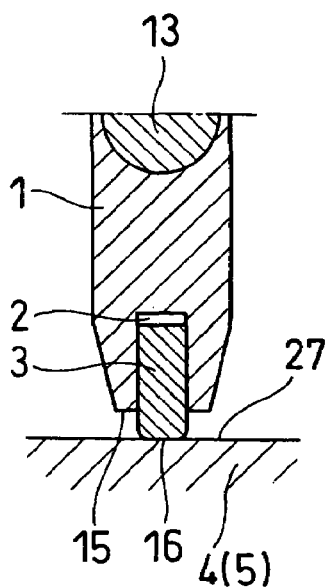
FIG. 4A is a schematic view showing the butterfly valve in a full close position.
Figure 4B:
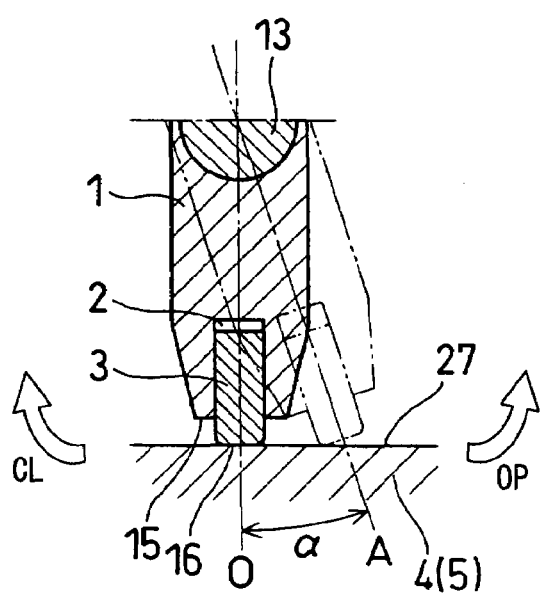
FIG. 4B is a schematic view showing an EGR leakage dead band of the butterfly valve.

As referred to FIGS. 4A, 4B, the ECU 500 sets the full close control point (A) within the EGR leakage dead band ($\alpha°$). When the throttle position of the butterfly valve 1 is in the full close control point (A), the slide surface 16 of the seal ring 3, which is provided to the outer circumferential periphery of the butterfly valve 1, sticks to the seat surface 27 of the nozzle 5 by the radially expanding tension of the seal ring 3. Thus, the slide surface 16 of the seal ring 3 tightly makes contact with the seat surface 27 of the nozzle 5.

In this condition, the gap between the outer circumferential periphery of the butterfly valve 1 and the seat surface 27 of the nozzle 5 is sealed. When the butterfly valve 1 is maintained at the full close control point (A) to block the EGR passage, leakage of EGR gas is steadily restricted, so that EGR gas is not mixed with intake air.

Next, effects of this embodiment are described.

In the above throttle control apparatus provided to the EGR apparatus, the full close control point (A) is set in advance of the full close position (O), to which the butterfly valve 1 is biased by the biasing force of the return spring 31 when electricity supply to the electric motor 9 is terminated. That is, the full close control point (A) is set at the throttle position deviated slightly with respect to the full close position (O) in the open rotative direction (OP).

The ECU 500 continues electricity supply to the electric motor 9 in the full close control of the butterfly valve 1 during the engine operation such that the butterfly valve 1 stops at the full close control point (A). Thus, the ECU 500 controls to apply both the driving force of the electric motor 9 and the biasing force of the return spring 31 to all the reduction gears constructed of the first to third gears 41, 42, 43 provided for transmitting the driving force of the electric motor 9 to the butterfly valve 1. In this operation, the ECU 500 does not terminate electricity supply to the electric motor 9 in the full close control of the butterfly valve 1 during the engine operation.

In general, the first to third gears 41, 42, 43 define a predetermined backlash therebetween so that the first to third gears 41, 42, 43 are smoothly movable in the structure of reduction gears. Specifically, each of the teeth 44 of the first gear 41 has the surface defining backlash with respect to the surface of each of teeth of the large diameter gear 45 of the second gear 42. Each of teeth of the small diameter gear 46 of the second gear 42 has the surface defining backlash with respect to the surface of each of the teeth 49 of the third gear 43.

In this structure, among the first to third gears 41, 42, 43 constructing the reduction gears, the surfaces of the teeth of the first gear 41 and the second gear 42 define the backlash therebetween, and the surfaces of the teeth of the second gear 42 and the third gear 43 define the backlash therebetween.

The electric motor 9 and the intermediate shaft 12 may be vibrated due to transmission of vibration of both the engine 600 and the vehicle via the housing 4. Even in this condition, the driving force of the electric motor 9 and the biasing force of the return spring 31 are applied to all the first to third gears 41, 42, 43 constructing the reduction gears.

The surface of a tooth of one of the gears is biased to the surface of a tooth of the other gear, which is geared with the one gear. Specifically, the surface of one of the teeth 44 of the first gear 41 is biased to the surface of one of the teeth 44 of the second gear 42, which is geared with the first gear 41. Similarly, the surface of one of the teeth 44 of the second gear 42 is biased to the surface of one of the teeth 44 of the first gear 41, which is geared with the second gear 42. The surface of one of the teeth of the second gear 42 is biased to the surface of one of the teeth 49 of the third gear 43, which is geared with the second gear 42. Similarly, the surface of one of the teeth 49 of the third gear 43 is biased to the surface of one of the teeth of the second gear 42, which is geared with the third gear 43.

In this structure, the first to third gears 41, 42, 43 can be restricted from causing play therebetween due to transmission of vibration from the engine 600 and the vehicle. Therefore, two of the first to third gears 41, 42, 43, which are adjacent to each other, can be restricted from causing repeatedly collision and ablation relative to each other. That is, each of the teeth 44 of the first gear 41 and the large diameter gear 45 of the second gear 42 can be restricted from causing repeatedly collision and ablation relative to each other. The small diameter gear 46 of the second gear 42 and each of the teeth 49 of the third gear 43 can be restricted from causing repeatedly collision and ablation relative to each other. Thus, the surfaces of the teeth of the first to third gears 41, 42, 43 of the reduction gears can be restricted from causing abnormal ablation therebetween.

In this structure, the first to third gears 41, 42, 43 can be restricted from causing play therebetween due to transmission of vibration from the engine 600 and the vehicle, so that noise caused by the play in the reduction gears can be restricted. Thus, the EGR apparatus can be restricted from causing noise.

The ECU 500 sets the range between the full close control point (A) and the full open position (C) as the control range (A-C) in which the ECU 500 is capable of manipulating the butterfly valve 1 by controlling electricity supplied to the electric motor 9. In this structure, the driving force of the electric motor 9 and the biasing force of the return spring 31 are regularly applied to all the first to third gears 41, 42, 43, which construct the reduction gears, throughout the control range (A-C). Thus, the surfaces of the teeth of the first to third gears 41, 42, 43 of the reduction gears can be restricted from causing abnormal ablation therebetween, throughout the control range (A-C).

The surfaces of the teeth of the first to third gears 41, 42, 43 of the reduction gears can be restricted from causing abnormal ablation therebetween, so that the first to third gears 41, 42, 43 can be sufficiently meshed with each other in the control to rotate the butterfly valve 1 in the open rotative direction (OP) by utilizing the driving force of the electric motor 9. Thus, power transmission performance of the reduction gear constructed of the first to third gears 41, 42, 43 can be maintained.

In this embodiment, the substantially C-shaped seal ring 3 is fitted into the seal ring groove 2 of the butterfly valve 1. This EGR valve having such seal ring 3 has the EGR leakage dead band ($\alpha°$), in which leakage of EGR gas is substantially constant, in the vicinity of the full close position (O). The ECU 500 sets the full close control point (A) within the EGR leakage dead band ($\alpha°$).

The ECU 500 performs the full close control to control the electric motor 9 so as to generate the driving force manipulating the throttle position of the butterfly valve 1 toward the full close control point (A), which is in advance of the full close position (O), i.e., slightly deviated with respect to the full close position (O) in the open rotative direction (OP). Even in this condition, the gap between the outer circumferential periphery of the butterfly valve 1 and the seat surface 27 of the nozzle 5 can be steadily sealed by the radially expanding tension of the seal ring 3. Thus, leakage of EGR gas can be reduced in the full close control of the butterfly valve 1.

Second Embodiment

Figure 7:
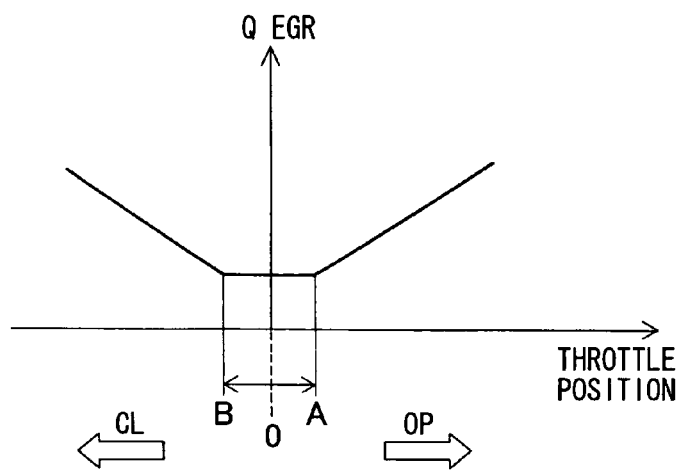
FIG. 7 is a graph showing a relationship between an amount Q of EGR gas and a throttle position of the butterfly valve.
Figure 5:
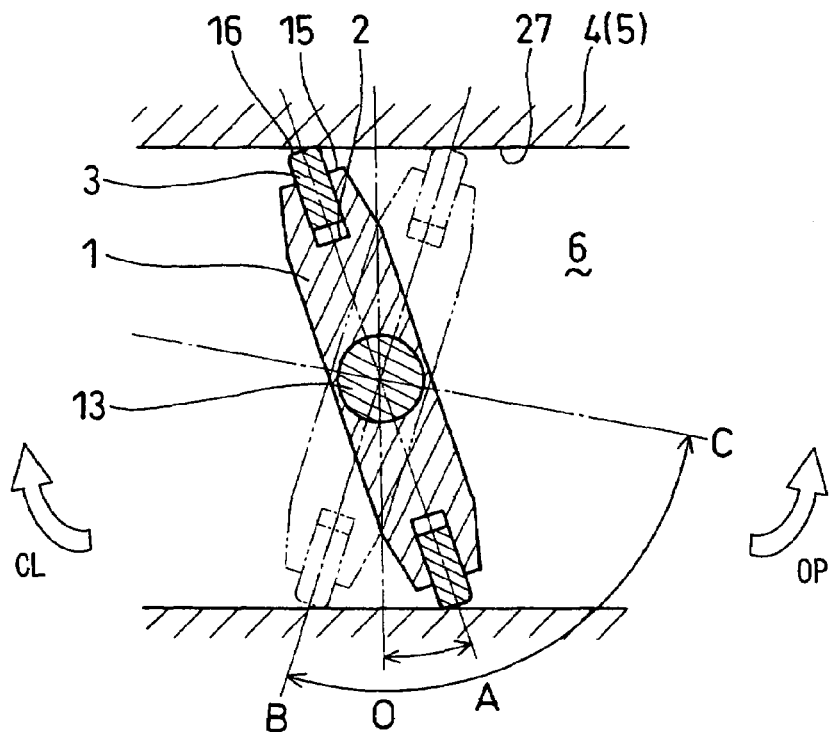
FIG. 5 is a schematic view showing a rotative angular range in the full close control of the butterfly valve and a control range of the electric motor for the butterfly valve, according to a second embodiment.
Figure 6A:
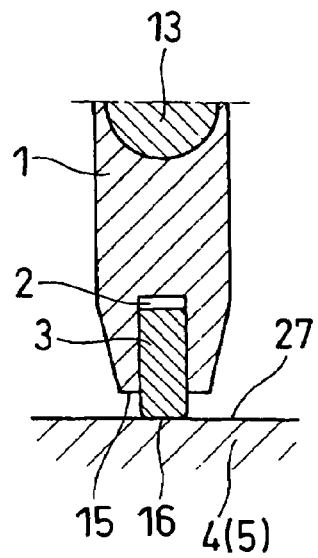
FIG. 6A is a schematic view showing the butterfly valve in a full close position.

As shown in FIGS. 5 to 7, the EGR valve includes the butterfly valve 1 for controlling the EGR amount of high temperature gas such as EGR gas supplied into each of the combustion chambers 610 of the engine 600. The butterfly valve 1 is fixed to the one axial end of the valve shaft 13. The butterfly valve 1 has the outer circumferential periphery, throughout which the seal ring groove 2 substantially extends. The seal ring groove 2 is in a substantially annular shape. The substantially C-shaped seal ring 3 is fitted to the seal ring groove 2 of the butterfly valve 1. The seal ring 3 is capable of applying sealing force to the seat surface 27 of the nozzle 5 by utilizing radial tension working to radially expand the seal ring 3. The housing 4 of the EGR valve is provided midway through the EGR pipe communicating the exhaust pipe with the intake pipe. The housing 4 has therein the substantially cylindrical nozzle 5 defining therein the EGR passage 6.

The throttle control apparatus is constructed of a valve operating device, the ECU 500, the coil spring 7, and the like. As referred to FIG. 1B, the throttle control apparatus includes the electric motor 9 for manipulating the butterfly valve 1 and the reduction gears, which serves as the transmission device, similarly to the first embodiment. The reduction gears control rotation speed of the motor shaft 11 of the electric motor 9 at a predetermined gear ratio by performing two-stage gear reduction. The reduction gears increase the driving force of the electric motor 9 transmitted to the valve shaft 13 of the butterfly valve 1. The reduction gears are constructed of the first gear (motor gear) 41, the second gear (intermediate gear) 42, the third gear (valve gear) 43, and the like. The first gear 41 is fixed to the motor shaft 11 of the electric motor 9. The second gear 42 is geared with the first gear 41. The third gear 43 is geared with the second gear 42. The third gear 43 is fixed to the other axial end of the valve shaft 13. The third gear 43 is attached with the coil spring 7.

When the ECU 500 stops electricity supply to the electric motor 9, the butterfly valve 1 is in the full close position (O) by being applied with the biasing force of the coil spring 7. As referred to FIGS. 5 to 7, the ECU 500 performs the full close control of the butterfly valve 1 in the engine operation. Specifically, in this full close control, the ECU 500 continues electricity supply to the electric motor 9, such that the butterfly valve 1 repeats rotation in both open and close rotative directions by passing through the full close position (O) within a predetermined rotative angular range in the vicinity of the full close position (O).

When electricity supply to the electric motor 9 is terminated, the biasing force of the return spring 31 and the biasing force of the default spring 32 balance at the neutral position. The neutral position corresponds to the full close position (O) of the butterfly valve 1 being biased by both the return spring 31 and the default spring 32.

As referred to FIG. 5, the butterfly valve 1 is rotated from the full close position (O) to a first intermediate position (A) in the open rotative direction (OP). In addition, the butterfly valve 1 is rotated in the close rotative direction (CL) from the full close position (O) to a second intermediate position (B). The predetermined rotative angular range corresponds to a range from the first intermediate position (A) to the second intermediate position (B) through the full close position (O). The predetermined rotative angular range is defined by θ=±2.5° to ±5.5°, preferably θ=±3.0° to ±5.0°, or more preferably θ=±3.5° around the full close position (O).

As referred to FIG. 5, the first intermediate position (A) is an intermediate position where θ=+2.5° to +5.5°, preferably θ=+3.0° to +5.0°, or more preferably θ=+3.5° rotated toward the open rotative direction (OP) with respect to the full close position (O, θ=0°). The first intermediate position (A) is a first neutral position in which the driving force of the electric motor 9 and the biasing force of the return spring 31 balance with each other. The first intermediate position (A) is also a first reverse position where the rotative direction of the butterfly valve is reversed from the open rotative direction (OP) to the close rotative direction (CL).

As referred to FIG. 5, the second intermediate position (B) is an intermediate position where θ=−2.5° to −5.5°, preferably θ=−3.0° to −5.0°, or more preferably θ=−3.5° rotated toward the close rotative direction (CL) with respect to the full close position (O, θ=0°). The second intermediate position (B) is a second neutral position in which the driving force of the electric motor 9 and the biasing force of the default spring 32 balance with each other. The second intermediate position (B) is also a second reverse position where the rotative direction of the butterfly valve is reversed from the close rotative direction (CL) to the open rotative direction (OP).

The ECU 500 controls electricity supplied to the electric motor 9 in the full close control of the butterfly valve 1 during the engine operation. Specifically, the ECU 500 reverses the rotative direction of the butterfly valve 1 at the time point where the throttle position, which is detected using the EGR sensor 50, becomes the second intermediate position (B) after passing through the first intermediate position (A) and the full close position (O). More specifically, the ECU 500 reverses the rotative direction of the electric motor 9 at the time point where the throttle position becomes the second intermediate position (B) after passing through the first intermediate position (A) and the full close position (O).

Thereafter, the ECU 500 controls electricity supplied to the electric motor 9 so as to reverse the rotative direction of the butterfly valve 1 at the time point where the throttle position, which is detected using the EGR sensor 50, becomes the first intermediate position (A) after passing through the full close position (O). Specifically, the ECU 500 reverses the rotative direction of the electric motor 9 at the time point where the throttle position becomes the first intermediate position (A) after passing through the full close position (O).

Thereafter, the ECU 500 controls electricity supplied to the electric motor 9 so as to reverse the rotative direction of the butterfly valve 1 at the time point where the throttle position, which is detected using the EGR sensor 50, becomes the second intermediate position (B) after passing through the full close position (O). Specifically, the ECU 500 reverses the rotative direction of the electric motor 9 at the time point where the throttle position becomes the second intermediate position (B) after passing through the full close position (O).

In the above operation, the ECU 500 repeatedly performs the full close control within the predetermined rotative angular range in the vicinity of the full close position (O).

Alternatively, the ECU 500 may perform a deceleration control so as to gradually decelerate the operating speed of the butterfly valve 1 toward either the first intermediate position (A) or the second intermediate position (B) immediately before the throttle position, which is detected using the EGR sensor 50, becomes either the first intermediate position (A) or the second intermediate position (B). Alternatively, the ECU 500 may perform a constant control so as to manipulate the butterfly valve 1 at substantially constant operating speed toward the second intermediate position (B) after passing through the first intermediate position (A) and the full close position (O). Alternatively, the ECU 500 may perform a constant control so as to manipulate the butterfly valve 1 at substantially constant operating speed toward the first intermediate position (A) after passing through the second intermediate position (B) and the full close position (O).

The ECU 500 reverses the rotative direction of the butterfly valve 1 from one of the open and close rotative directions (OP, CL) to the other of the open and close rotative directions (OP, CL) at the time point where the throttle position becomes either the first intermediate position (A) or the second intermediate position (B). In this operation, the driving force of the electric motor 9 once becomes zero. Specifically, the ECU 500 gradually reduces the electricity supply to the electric motor 9 immediately before the throttle position becomes either the first intermediate position (A) or the second intermediate position (B). Thereafter, the ECU 500 finally terminates electricity supply to the electric motor 9 substantially to zero. In this operation, the ECU 500 is capable of reversing the rotative direction of the electric motor 9 by resuming electricity supply to the electric motor 9 immediately after the moment where the throttle position becomes either the first intermediate position (A) or the second intermediate position (B).

The ECU 500 controls electricity supplied to the electric motor 9 so as to rotate the butterfly valve 1 in the predetermined control range (B-O-A-C) between the second intermediate position (B) and the full open position (C) within the rotative range, thereby controlling the butterfly valve 1 during the engine operation. The ECU 500 stops electricity supply to the electric motor 9 when the engine 600 stops (engine OFF).

Figure 6B:
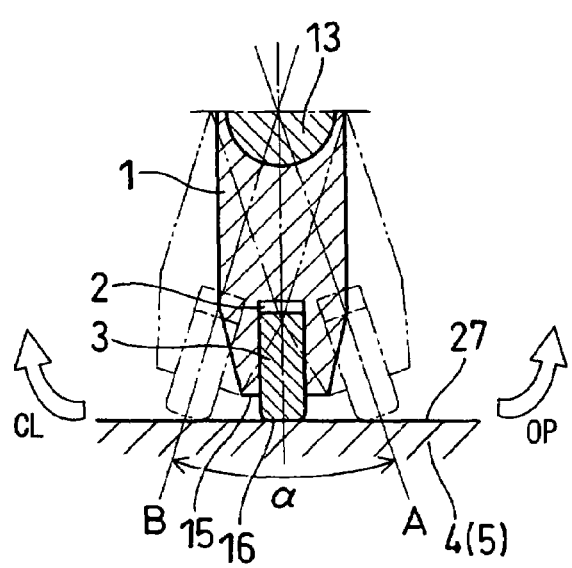
FIG. 6B is a schematic view showing an EGR leakage dead band of the butterfly valve, according to the second embodiment.

In this embodiment, as referred to FIGS. 6B and 7, the EGR valve of the EGR apparatus has the EGR leakage dead band (α°), in which leakage of EGR gas is substantially constant, in the vicinity of the full close position (O). In the EGR leakage dead band (α°), leakage of EGR gas does not substantially change because of expansion caused by the tension radially expanding the seal ring 3. The EGR leakage dead band has the range of ±2.5 to ±5.5°, or ±3.0 to ±5.0°, or ±3.5° around the full close position (O). The ECU 500 sets the predetermined rotative angular range (A-O-B) within the EGR leakage dead band (α°). In this embodiment, the EGR leakage dead band (α°) defines the predetermined rotative angular range (A-O-B). The predetermined rotative angular range (A-O-B) may be less than the EGR leakage dead band (α°).

The ECU 500 stores the full close position (O) of the butterfly valve 1 to the memory of the microcomputer. The ECU 500 stores the dead band maximum position (dead band open limit, DBMAX), to which the butterfly valve 1 is rotated slightly from the full close position (O, θ=0°) in the open rotative direction (OP) within the EGR leakage dead band (α°), as the first intermediate position (A) in the memory of the microcomputer thereof. The ECU 500 stores the dead band minimum position (dead band close limit, DBMIN), to which the butterfly valve 1 is rotated slightly from the full close position (O, θ=0°) in the close rotative direction (CL) within the EGR leakage dead band (α°), as the second intermediate position (B) in the memory of the microcomputer thereof. The ECU 500 stores the full open position (C) of the butterfly valve 1 to the memory. The ECU 500 stores the rotative angular range between the second intermediate position (B) and the full open position (C) as the control range (B-O-A-C). The ECU 500 stores the rotative angular range between the first intermediate position (A) and the second intermediate position (B) as the control range (A-O-B).

The coil spring 7 is interposed between the outer wall of the housing 4 defining the gear housing 14 and the third gear 43.

The coil spring 7 includes the return spring 31 and the default spring 32. The return spring 31 is connected with the default spring 32 via the connecting portion to which the U-shaped hook portion 36 is provided. The U-shaped hook portion 36 is supported by the full close stopper 35, which is screwed into the housing 4, when the engine 600 stops or when electricity supply to the electric motor 9 is terminated. The return spring 31 biases the third gear 43 so as to rotate the butterfly valve 1 in the close rotative direction (CL) from either the first intermediate position (A) or the full open position (C) toward the full close position (O) of the butterfly valve 1. The return spring 31 serves as the first spring. The default spring 32 biases the third gear 43 so as to rotate the butterfly valve 1 in the open rotative direction (OP) from the second intermediate position (B), which is beyond the full close position (O), toward the full close position (O) of the butterfly valve 1. The default spring 32 serves as the second spring.

In the throttle control apparatus provided to the EGR apparatus, the ECU 500 performs the full close control of the butterfly valve 1. Specifically, the ECU 500 continues electricity supply to the electric motor 9, such that the butterfly valve 1 repeats rotation in both open and close rotative directions (OP, CL) by passing through the full close position (O) within the predetermined rotative angular range in the vicinity of the full close position (O) in the full close control. Thus, the ECU 500 controls to apply both the driving force of the electric motor 9 and the biasing force of the return spring 31 to all the reduction gears constructed of the first to third gears 41, 42, 43 provided for transmitting the driving force of the electric motor 9 to the butterfly valve 1.

More specifically, when the throttle position of the butterfly valve 1 is between the full close position (O) and the first intermediate position (A), the first to third gears 41, 42, 43 are applied with the driving force of the electric motor 9 via the motor shaft 11 and the biasing force of the return spring 31 caused by elastic deformation thereof. In this condition, the first to third gears 41, 42, 43 are applied with the driving force of the electric motor 9 to rotate the butterfly valve 1 in the open rotative direction (OP) and the biasing force of the return spring 31 to return the butterfly valve 1 toward the full close position (O). When the throttle position of the butterfly valve 1 is between the full close position (O) and the second intermediate position (B), the first to third gears 41, 42, 43 are applied with the driving force of the electric motor 9 via the motor shaft 11 and the biasing force of the default spring 32 caused by elastic deformation thereof. In this condition, the first to third gears 41, 42, 43 are applied with the driving force of the electric motor 9 to rotate the butterfly valve 1 in the close rotative direction (CL) and the biasing force of the default spring 32 to return the butterfly valve 1 toward the full close position (O).

In this condition, the surface of a tooth of one of the gears is biased to the surface of a tooth of the other gear, which is geared with the one gear, similarly to the first embodiment. In this structure, the first to third gears 41, 42, 43 can be restricted from causing play therebetween due to transmission of vibration from the engine 600 and the vehicle. Therefore, two of the first to third gears 41, 42, 43, which are adjacent to each other, can be restricted from causing abnormal ablation relative to each other. In this structure, the first to third gears 41, 42, 43 can be restricted from causing play therebetween due to transmission of vibration from the engine 600 and the vehicle, so that noise caused by the play in the reduction gears can be restricted. Thus, the EGR apparatus can be restricted from causing noise.

In this embodiment, the substantially C-shaped seal ring 3 is fitted into the seal ring groove 2 of the butterfly valve 1, similarly to the first embodiment. This EGR valve having such seal ring 3 has the EGR leakage dead band ($\alpha°$), in which leakage of EGR gas is substantially constant, in the vicinity of the full close position (O). The ECU 500 sets the predetermined rotative angular range within the EGR leakage dead band ($\alpha°$).

The ECU 500 controls electricity supply to the electric motor 9 such that the butterfly valve 1 repeats rotative motions beyond the full close position (O) within the predetermined rotative angular range in the full close control. Even in this condition, the gap between the outer circumferential periphery of the butterfly valve 1 and the seat surface 27 of the nozzle 5 can be steadily sealed by the radially expanding tension of the seal ring 3. Thus, leakage of EGR gas can be reduced in the full close control of the butterfly valve 1.

The ECU 500 controls electricity supply to the electric motor 9 such that the driving force of the motor shaft 11 of the electric motor 9 is balanced with the biasing force of the return spring 31 in the first intermediate position (A). For example, the ECU 500 supplies small amount of electricity to the electric motor 9 to rotate the butterfly valve 1 in the open rotative direction (OP), so that the butterfly valve 1 can be restricted from rotating beyond the first intermediate position (A) in the full close control. Thus, leakage of EGR gas can be reduced.

The ECU 500 controls electricity supply to the electric motor 9 such that the driving force of the motor shaft 11 of the electric motor 9 is balanced with the biasing force of the default spring 32 in the second intermediate position (B). For example, the ECU 500 supplies small amount of electricity to the electric motor 9 to rotate the butterfly valve 1 in the close rotative direction (CL), so that the butterfly valve 1 can be restricted from rotating beyond the second intermediate position (B) in the full close control. Thus, leakage of EGR gas can be reduced.

In this operation, the butterfly valve 1 repeats the rotative motions beyond the full close position (O) within the control range (A-O-B) in the full close control. Thus, the butterfly valve 1 is capable of scraping foreign matters (deposit), which stack on the seat surface 27 of the nozzle 5, via the tip end of the seal ring 3 in the full close control. Thus, the seal ring 3 can be restricted from seizing due to deposit adhering and stacking on the butterfly valve 1 and the seal ring 3, after stopping the engine 600, for example. Furthermore, the butterfly valve 1 can be smoothly rotated in the EGR valve when the engine 600 starts.

When the ECU 500 performs the full close control of the butterfly valve 1 during the engine operation, the ECU 500 primarily sets the control target of the butterfly valve 1 at the second intermediate position (B). Thereafter, the ECU 500 updates, i.e., changes the control target of the butterfly valve 1 to the first intermediate position (A) at the time point where the throttle position, which is detected using the EGR sensor 50, becomes the second intermediate position (B). Thereafter, the ECU 500 changes the control target of the butterfly valve 1 to the second intermediate position (B) at the time point where the throttle position, which is detected using the EGR sensor 50, becomes the first intermediate position (A). The ECU 500 may perform this control to repeatedly rotate the butterfly valve 1 in the full close control of the butterfly valve 1 during the engine operation. In this operation, the butterfly valve 1 moves in a rotative angular range greater than the control range (B-O-A-C) in the full close control during the engine operation.

When electricity supplied to the electric motor 9 is terminated, the butterfly valve 1 is in the full close position (O) by being applied with the biasing force of the coil spring 7. The ECU 500 may store the full close position (O) as the full close control point (θ=0°) in the memory of the microcomputer thereof. In this case, the ECU 500 primarily sets the control target of the butterfly valve 1 at the second intermediate position (B) in the full close control of the butterfly valve 1 during the engine operation. Thereafter, the ECU 500 changes the control target of the butterfly valve 1 to the first intermediate position (A) at the time point where the throttle position, which is detected using the EGR sensor 50, passes by the full close control point (θ=0°). Thereafter, the ECU 500 changes the control target of the butterfly valve 1 to the second intermediate position (B) at the time point where the throttle position, which is detected using the EGR sensor 50, passes by the full close control point (θ=0°). In this operation, the butterfly valve 1 moves in a rotative angular range less than the control range (B-O-A-C) in the full close control during the engine operation.

Modification

In the above embodiments, the nozzle 5 is fitted to the inner circumferential periphery of the nozzle-fitting portion 23 of the housing 4, and the nozzle 5 rotatably accommodates the butterfly valve 1. Alternatively, the housing 4 may rotatably accommodate the butterfly valve 1 directly therein. In this structure, the nozzle 5 is not necessary, so that reduction in both number of components and manufacturing process can be achieved.

The seal ring groove (annular groove) 2 need not be provided on the outer circumferential periphery of the butterfly valve 1. The seal ring 3 need not be provided on the outer circumferential periphery 15 of the butterfly valve 1. In this structure, the seal ring 3 is not necessary, so that reduction in both number of components and manufacturing process can be achieved.

In the above embodiments, the housing 4 constructs a part of the EGR pipe by being connected midway through the EGR pipe of the EGR apparatus. Alternatively, the housing may construct a part of the intake pipe or a part of the exhaust pipe.

In the above embodiments, the butterfly valve 1 is secured to the one axial end of the valve shaft 13 by, for example, welding for controlling the amount of EGR gas in accordance with the engine operating condition. Alternatively, the butterfly valve 1 may be secured to the one axial end of the valve shaft 13 by, for example, screwing a fastener such as a screw and a bolt.

In the above embodiments, the valve actuator for the butterfly valve 1 of the EGR valve is constructed of the electric motor 9 and the electric actuator including the transmission device such as reduction gears. Alternatively, the valve actuator may be constructed of a negative-pressure actuator, which includes a solenoid control valve or an electric negative pressure control valve. The valve actuator may be constructed of a solenoid actuator such as an electromagnetically controlled hydraulic valve.

The above structure in the above embodiments may be applied as a fluid control valve, which includes the housing and the valve, to either an intake air control valve such as a throttle valve for controlling intake air drawn into a combustion chamber of an engine, an exhaust gas control valve for controlling exhaust gas discharged from a combustion chamber of an engine, or an idling rotation control valve for controlling intake air bypassing a throttle valve, instead of being applied to the EGR valve.

In the above embodiments, the throttle control apparatus is applied to the EGR apparatus for controlling fluid such as EGR gas (high-temperature fluid) in an internal combustion engine. The throttle control apparatus is not limited to being applied to the EGR apparatus for an internal combustion engine. The throttle control apparatus may be applied to any other control valve such as a fluid passage ON/OFF valve, a fluid passage switching valve, and a fluid pressure control valve, as a fluid control valve including the housing and the valve.

The above structure as a fluid control valve in the above embodiments may be applied to an intake air control valve such as a throttle valve for controlling intake air drawn into a combustion chamber of an engine, instead of being applied to the EGR valve in the above embodiments. Alternatively, the above structure as a fluid control valve in the above embodiments may be applied to either an exhaust gas control valve, for controlling exhaust gas discharged from a combustion chamber of an engine, or an idling rotation control valve for controlling intake air bypassing a throttle valve, instead of being applied to the EGR valve. In the above embodiments, a turbocharged diesel engine is described as an example of an internal combustion engine. Alternatively, the internal combustion engine may be a normal aspiration engine, which is not provided with a turbocharger or a supercharger. The internal combustion engine may be a gasoline engine.

In the above embodiments, the wall surface defining the fluid passage in the housing 4 partially defines the seat surface 27 on which the slide surface of the seal ring 3 slides. Alternatively, the seal ring groove 2 and the seal ring 3 may be omitted. In this case, the fluid passage of the housing 4 may partially define a contact surface on which the slide surface of the outer circumferential periphery of the butterfly valve 1 slides.

In the above embodiments, the butterfly valve 1 is described as an example of the valve. The above structure of the valve may be applied to any one of a single-swing valve, a rotary valve, a poppet valve, a shutter, a door rotatably supported at one end thereof, and the like.

In the above embodiments, the coil spring 7 is provided to serve as the biasing unit to bias the butterfly valve 1 in the close rotative direction (CL) toward the full close position (O). Alternatively, a torsion spring, a double coil spring, a nonuniform pitch coil spring, and/or an elastomer such as a rubber member may be provided as a biasing unit. The first or second intermediate position may be defined at an intermediate position midway between the full close position (O) and the full open position (C).

In the above embodiments, the full close position (O) is defined at the position in which the U-shaped hook portion 36 of the coil spring 7 hooks to the full close stopper (full close position adjust screw) 35, which is screwed into the gear housing 14 of the housing 4. Alternatively, the full close position (O) may be changed by adjusting the length of the full close stopper 35 protruding from the gear housing 14 of the housing 4. When the engine 600 stops, the butterfly valve 1 is in the full close position (O) by being biased by the biasing unit. In this condition, the biasing force of the biasing unit, i.e., first and second springs may be adjusted such that the butterfly valve 1 is inclined to one of the open rotative direction (OP) and the close rotative direction (CL) with respect to the direction perpendicular to the axis of the EGR passage 6 by a predetermined angle. The axis of the EGR passage 6 is oriented substantially along an average flow direction of fluid in the EGR passage 6. In this case, leakage of fluid can be reduced to be substantially zero in the full close position (O) by setting the full close position (O) within the EGR leakage dead band ($\alpha°$), similarly to the first and second embodiments.

In the above embodiments, the first to third gears 41, 42, 43 construct the reduction gears serving as the transmission device to control the rotation speed of the motor shaft 11 at a predetermined gear ratio by performing two-stage gear reduction. The reduction gears increase the driving force of the electric motor 9 transmitted to the valve shaft 13 of the butterfly valve 1. Alternatively, the transmission device may be constructed of any one of a worm gear fixed to the motor shaft of the motor, a helical gear rotated by being geared with the worm gear, and the like.

Alternatively, a pinion gear may be provided as a final gear, and the valve shaft of the valve may be provided with a rack to be geared with the pinion gear for converting a rotating motion to a reciprocating motion.

The housing 4 may rotatably support the intermediate shaft 12 such that the intermediate shaft 12 is rotatable relative to the housing 4. In this structure, the second gear 42 may by fixed to the intermediate shaft 12.

The transmission device such as reduction gears may be constructed of first and second gears (rotative members). The transmission device such as reduction gears may be constructed of at least four gears.

The above processings such as calculations and determinations are not limited being executed by the ECU 500. The control unit may have various structures including the ECU 500 shown as an example.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A throttle control apparatus having a fluid passage connecting with a combustion chamber of an internal combustion engine, the throttle control apparatus comprising:

a valve for communicating and blocking the fluid passage;

a motor for generating driving force to rotate the valve in at least one of an open rotative direction and a close rotative direction;

a plurality of gears for transmitting the driving force of the motor to the valve;

a biasing unit for generating biasing force to bias the valve in the close rotative direction; and a control unit for supplying electricity to the motor to generate the driving force, wherein when the control unit terminates electricity supply to the motor, the valve is biased to a full close position by being applied with the biasing force of the biasing unit, and when the control unit performs a full close control to manipulate the valve toward the full close position, the control unit continues electricity supply to the motor to stop the valve at a full close control point, which is set in advance of the full close position, wherein the full close control point is an intermediate position in which the valve is manipulated from the full close position in the open rotative direction.

2. The throttle control apparatus according to claim 1, further comprising:

a throttle position detecting unit for detecting a throttle position of the valve, wherein the control unit maintains electricity supplied to the motor at a substantially constant value when the throttle position becomes the full close control point in the full close control.

3. The throttle control apparatus according to claim 1, wherein the full close control point and a full open position defines therebetween a control range in which the control unit is capable of manipulating the valve by controlling electricity supplied to the motor.

4. The throttle control apparatus according to claim 1, wherein when the valve is in the full close control point defining an intermediate position, the control unit controls electricity supplied to the motor such that the driving force of the motor and the biasing force of the biasing unit balance with each other.

5. The throttle control apparatus according to claim 1, wherein the control unit performs the full close control in an operation of the internal combustion engine.

6. The throttle control apparatus according to claim 1,
wherein the plurality of gears includes a valve gear rotatable integrally with the valve, and
the biasing unit includes a spring for applying the biasing force to one of the valve gear and the valve in a direction where the valve returns to the full close position.

7. The throttle control apparatus according to claim 1, further comprising:

a housing that has a wall surface defining therein a fluid passage; and a seal ring that is fitted to an annular groove defined entirely in an outer circumferential periphery of the valve for sealing a gap between the wall surface of the housing and the outer circumferential periphery of the valve when the valve is in the vicinity of the full close position in the full close control.

8. The throttle control apparatus according to claim 7,
wherein the valve, the housing, and the seal ring construct a fluid control valve for controlling fluid supplied to a combustion chamber of the internal combustion engine, the fluid control valve has a dead band, in which leakage of fluid is substantially constant, in the vicinity of the full close position, and the full close control point is defined in the dead band.

9. A throttle control apparatus having a fluid passage connecting with a combustion chamber of an internal combustion engine, the throttle control apparatus comprising:

a valve for communicating and blocking the fluid passage;

a motor for generating driving force to rotate the valve in at least one of an open rotative direction and a close rotative direction;

a plurality of gears for transmitting the driving force of the motor to the valve;

a biasing unit for generating biasing force to bias the valve in at least one of the open rotative direction and the close rotative direction; and a control unit for supplying electricity to the motor to generate the driving force;

wherein when the control unit terminates electricity supply to the motor, the valve is biased to a full close position by being applied with the biasing force of the biasing unit, and when the valve is in a predetermined range in the vicinity of the full close position, the control unit is adapted to controlling electricity supplied to the motor such that the valve repeats movement to pass through the full close position, wherein the valve is movable from the full close position to a first intermediate position on the open rotative direction, the valve is movable from the full close position to a second intermediate position in the close rotative direction, and the predetermined range in the vicinity of the full close position is defined from the first intermediate position to the second intermediate position through the full close position.

10. The throttle control apparatus according to claim 9, wherein the predetermined range in the vicinity of the full close position includes a throttle position, which defines a control range with respect to a full open position, and the control unit is capable of manipulating the valve by controlling electricity supplied to the motor in the control range.

11. The throttle control apparatus according to claim 9, further comprising:

a throttle position detecting unit for detecting a throttle position of the valve, wherein the control unit controls electricity supplied to the motor to reverse a moving direction of the valve when the throttle position becomes the second intermediate position after passing through the first intermediate position, in a condition where the control unit performs a full close control to manipulate the valve to the full close position, and the control unit controls electricity supplied to the motor to reverse the moving direction of the valve at every time point when the throttle position becomes one of the first intermediate position and the second intermediate position, after the throttle position once becomes the second intermediate position in the full close control.

12. The throttle control apparatus according to claim 9, wherein the control unit performs the full close control to manipulate the valve to the full close position in an operation of the internal combustion engine.

13. The throttle control apparatus according to claim 9, further comprising:

a housing that has a wall surface defining therein a fluid passage; and a seal ring that is fitted to an annular groove defined entirely in an outer circumferential periphery of the valve for sealing a gap between the wall surface of the housing and the outer circumferential periphery of the valve when the valve is in the vicinity of the full close position in the full close control.

14. The throttle control apparatus according to claim 13, wherein the valve, the housing, and the seal ring construct a fluid control valve for controlling fluid supplied to a combustion chamber of the internal combustion engine, the fluid control valve has a dead band, in which leakage of fluid is substantially constant, in the vicinity of the full close position, and the dead band includes the predetermined range in the vicinity of the full close position.

15. The throttle control apparatus according to claim 9, wherein the plurality of gears includes a valve gear rotatable integrally with the valve, and the biasing unit includes a first biasing unit and a second biasing unit for applying force to one of the valve gear and the valve in a direction where the valve returns to the full close position.

16. The throttle control apparatus according to claim 15, wherein the valve is movable from the full close position to a first intermediate position in the open rotative direction, the valve is movable from the full close position to a second intermediate position in the close rotative direction, the first biasing unit is a first spring for applying first biasing force to return the valve from at least the first intermediate position to the full close position, and the second biasing unit is a second spring for applying second biasing force to return the valve from at least the second intermediate position to the full close position.

17. The throttle control apparatus according to claim 16, wherein when the valve is in the first intermediate position defining a first neutral position, the control unit controls electricity supplied to the motor, such that the driving force of the motor and the first biasing force of the first spring balance with each other, and when the valve is in the second intermediate position defining a second neutral, the control unit controls electricity supplied to the motor, such that the driving force of the motor and the second biasing force of the second spring balance with each other.

* * * * *